(12) United States Patent
Hayashi et al.

(10) Patent No.: US 10,358,167 B2
(45) Date of Patent: Jul. 23, 2019

(54) VEHICLE FRONT STRUCTURE

(71) Applicant: TOYOTA JIDOSHA KABUSHIKI KAISHA, Toyota-shi (JP)

(72) Inventors: Takanori Hayashi, Toyota (JP); Kenji Sato, Ichinomiya (JP); Mamiko Yamatani, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/837,055

(22) Filed: Dec. 11, 2017

(65) Prior Publication Data

US 2018/0178845 A1 Jun. 28, 2018

(30) Foreign Application Priority Data

Dec. 22, 2016 (JP) .................................. 2016-249697

(51) Int. Cl.
*B62D 25/08* (2006.01)
*B62D 21/15* (2006.01)
(Continued)

(52) U.S. Cl.
CPC ............ *B62D 25/084* (2013.01); *B60K 11/04* (2013.01); *B62D 21/152* (2013.01); *B60R 19/34* (2013.01); *B60Y 2306/01* (2013.01)

(58) Field of Classification Search
CPC .... B62D 21/152; B62D 25/084; B60K 11/04; B60R 19/34
(Continued)

(56) References Cited

U.S. PATENT DOCUMENTS

2014/0062141 A1* 3/2014 Townson ................ G01B 5/24
296/193.11
2015/0266513 A1* 9/2015 Riedl ................... B62D 25/082
296/203.02
(Continued)

FOREIGN PATENT DOCUMENTS

JP 01-134514 U1 9/1989
JP 2009-67184 4/2009

OTHER PUBLICATIONS

Japanese Office Action issued in Japanese Patent Application No. 2016-249697 dated Apr. 16, 2019 (partial English translation).

*Primary Examiner* — Jason S Morrow
(74) *Attorney, Agent, or Firm* — Oblon, McClelland, Maier & Neustadt, L.L.P.

(57) ABSTRACT

A vehicle front structure includes a radiator support upper, a first connection member and a second connection member. The radiator support upper is provided with a connected portion on an inner side with respect to both ends of the radiator support upper in a vehicle width direction. When viewed in a vehicle longitudinal direction, the first connection member connects the connected portion with a bumper reinforcement in an oblique direction such that a portion of the first connection member, connected to the connected portion, is located on an inner side in the vehicle width direction with respect to a portion of the first connection member, connected to the bumper reinforcement. The second connection member connects the radiator support upper with a vehicle component. A portion of the second connection member, connected to the radiator support upper, is located on a central axis of the first connection member.

8 Claims, 8 Drawing Sheets

(51) Int. Cl.
*B60K 11/04* (2006.01)
*B60R 19/34* (2006.01)

(58) Field of Classification Search
USPC ............... 296/187.09, 193.1, 203.02, 187.1; 293/115
See application file for complete search history.

(56) References Cited

U.S. PATENT DOCUMENTS

| | | |
|---|---|---|
| 2015/0274211 A1* | 10/2015 | Riedl ................... B62D 25/084 296/187.09 |
| 2016/0052553 A1* | 2/2016 | Joest ...................... B62D 21/11 296/187.09 |
| 2017/0137063 A1* | 5/2017 | Lee ...................... B62D 21/152 |
| 2017/0259852 A1* | 9/2017 | Akif ..................... B62D 21/152 |
| 2018/0134242 A1* | 5/2018 | Humpenoeder ......... B60R 19/18 |

* cited by examiner

VEHICLE FRONT STRUCTURE

INCORPORATION BY REFERENCE

The disclosure of Japanese Patent Application No. 2016-249697 filed on Dec. 22, 2016 including the specification, drawings and abstract is incorporated herein by reference in its entirety.

BACKGROUND

1. Technical Field

The disclosure relates to a vehicle front structure.

2. Description of Related Art

Japanese Patent Application Publication No. 2009-67184 (JP 2009-067184 A) describes a vehicle body front structure. The vehicle body front structure includes a pair of bulkhead front stays. The bulkhead front stays suspend an upper side center of a bulkhead connection body and bumper extension members. The bulkhead connection body is connected to front side frames. The bumper extension members are connected to a front bumper beam.

SUMMARY

There is a vehicle front structure in which a first connection member and a second connection member are connected to a radiator support upper that constitutes part of a radiator support that supports a radiator in order to distribute a collision load in the event of a collision of a vehicle to a non-collision side across from a collision side via the first connection member and the second connection member.

However, if the first connection member and the second connection member are merely connected to the radiator support upper, a collision load is not efficiently distributed from the first connection member to the second connection member and, as a result, stress (bending stress) may concentrate on the first connection member, so there is room for improvement.

The disclosure provides a vehicle front structure that has such a configuration that a first connection member and a second connection member are connected to a radiator support upper and that is able to relieve stress concentration on the first connection member in the event of a collision.

A first aspect of the disclosure provides a vehicle front structure. The vehicle front structure includes: a radiator support upper provided with a connected portion on an inner side with respect to both ends of the radiator support upper in a vehicle width direction; a first connection member, when viewed in a vehicle longitudinal direction, connecting the connected portion with a bumper reinforcement in an oblique direction such that a portion of the first connection member at which the first connection member is connected to the connected portion, is located on an inner side in the vehicle width direction with respect to a portion of the first connection member at which the first connection member is connected to the bumper reinforcement, the oblique direction intersecting with the vehicle width direction; and a second connection member connecting the radiator support upper with a vehicle component, a portion of the second connection member at which the second connection member is connected to the radiator support upper being located on a central axis of the first connection member along the oblique direction.

With the vehicle front structure according to the first aspect, a collision load input from the bumper reinforcement in the event of a collision of the vehicle is input to the radiator support upper via the first connection member. The collision load is further transferred from the radiator support upper via the second connection member to the vehicle component on a non-collision side. The portion of the second connection member, connected to the radiator support upper, is located on the central axis of the first connection member. For this reason, in comparison with the configuration in which the portion of the second connection member, connected to the radiator support upper, is located off from the central axis of the first connection member, a collision load input to the first connection member is easy to be input to the second connection member via the radiator support upper. Thus, in the configuration in which the first connection member and the second connection member are connected to the radiator support upper, it is possible to relieve stress concentration on the first connection member in the event of a collision.

In the vehicle front structure according to the first aspect, when viewed in the vehicle longitudinal direction, the central axis of the first connection member and a central axis of the second connection member may at least partially overlap each other.

With the above configuration, since the first connection member and the second connection member are substantially arranged on a straight line, a collision load input from the first connection member via the radiator support upper to the second connection member is easy to be transferred to the non-collision side of the second connection member in the central axis direction. Thus, it is possible to further relieve stress concentration on the first connection member in the event of a collision.

In the first aspect, when viewed in the vehicle width direction, the central axis of the first connection member and a central axis of the second connection member may be arranged on a straight line.

In the first aspect, in vehicle plan view, the central axis of the first connection member and a central axis of the second connection member may be arranged on a straight line.

In the vehicle front structure according to the first aspect, the radiator support upper may include a lock portion for locking a hood of a vehicle. The lock portion may be integrally provided with the radiator support upper. The lock portion may be arranged on the central axis of the first connection member. The second connection member may be coupled to the radiator support upper via the lock portion.

With the above configuration, the lock portion for locking the hood of the vehicle is integrally provided with the radiator support upper. The second connection member is connected to the radiator support upper via the lock portion. Thus, in comparison with the configuration in which the second connection member is connected to the radiator support upper and the lock portion is provided at a portion separated from the radiator support upper, space required to install the lock portion is reduced. That is, it is possible to ensure space for the lock portion without increasing the size of the vehicle.

A second aspect of the disclosure provides a vehicle front structure. The vehicle front structure includes: a radiator support upper provided with a connected portion on an inner side with respect to both ends of the radiator support upper in a vehicle width direction; a plurality of first connection members, when viewed in a vehicle longitudinal direction, respectively arranged on both sides of the connected portion in the vehicle width direction, the plurality of first connection members connecting the connected portion with a bumper reinforcement in an oblique direction such that a first connection position is located on an inner side in the vehicle width direction with respect to a portion of each first connection member, connected to the bumper reinforcement, the oblique direction intersecting with the vehicle width direction, the first connection position being a position at which each first connection member is connected to the connected portion; and second connection members respectively arranged on both sides of the connected portion in the vehicle width direction, each second connection member connecting the radiator support upper with a vehicle component, a second connection position on at least one side of the both sides being aligned in a vehicle vertical direction with the first connection position on the one side, each second connection member being connected with the radiator support upper at the second connection position.

With the vehicle front structure according to the second aspect, a collision load input from the bumper reinforcement in the event of a collision of the vehicle is input to the radiator support upper via the first connection member. The collision load is transferred from the radiator support upper via the second connection member to the vehicle component on a non-collision side. On at least one side of both sides in the vehicle width direction, the first connection position and the second connection position are aligned in the vehicle vertical direction. For this reason, a collision load input from the first connection member to the radiator support upper at the one-side first connection position is easy to be input from the radiator support upper to the second connection member at the one-side second connection position. Thus, stress is difficult to concentrate on the first connection member, so it is possible to relieve stress concentration on the first connection member in the event of a collision in the configuration in which the first connection member and the second connection member are connected to the radiator support upper.

A third aspect of the disclosure provides a vehicle front structure. The vehicle front structure includes: a radiator support upper provided with a connected portion on an inner side with respect to both ends of the radiator support upper in a vehicle width direction; a first connection member, when viewed in a vehicle longitudinal direction, connecting the connected portion with a side member in an oblique direction such that a portion of the first connection member at which the first connection member is connected to the connected portion, is located on an inner side in the vehicle width direction with respect to a portion of the first connection member at which the first connection member is connected to the side member, the oblique direction intersecting with the vehicle width direction; and a second connection member connecting the radiator support upper with a vehicle component, a portion of the second connection member at which the second connection member is connected to the radiator support upper, being located on a central axis of the first connection member along the oblique direction.

With the vehicle front structure according to the third aspect, a collision load input from the side member in the event of a collision of the vehicle is input to the radiator support upper via the first connection member. The collision load is transferred from the radiator support upper via the second connection member to the vehicle component on a non-collision side. The portion of the second connection member, connected to the radiator support upper, is located on the central axis of the first connection member. For this reason, in comparison with the configuration in which the portion of the second connection member, connected to the radiator support upper, is located off from the central axis of the first connection member, a collision load input to the first connection member is easy to be input to the second connection member via the radiator support upper. Thus, stress is difficult to concentrate on the first connection member, so it is possible to relieve stress concentration on the first connection member in the event of a collision in the configuration in which the first connection member and the second connection member are connected to the radiator support upper.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a vehicle 10 and a vehicle front structure 20 according to a first embodiment will be described with reference to FIG. 1 to FIG. 5A. In each drawing, the arrow FR indicates a vehicle front side, the arrow OUT indicates an outer side in a vehicle width direction, and the arrow UP indicates a vehicle upper side. Hereinafter, when an upper side and a lower side are simply described, the upper side and the lower side respectively indicate an upper side and a lower side in a vehicle vertical direction. When a right side and a left side are simply described, the right side and the left side respectively indicate a right side and a left side in the vehicle width direction in a situation in which the vehicle 10 is viewed from the front. A vehicle longitudinal direction, the vehicle width direction and the vehicle vertical direction are orthogonal to one another.

<Overall Configuration>

Figure 1:
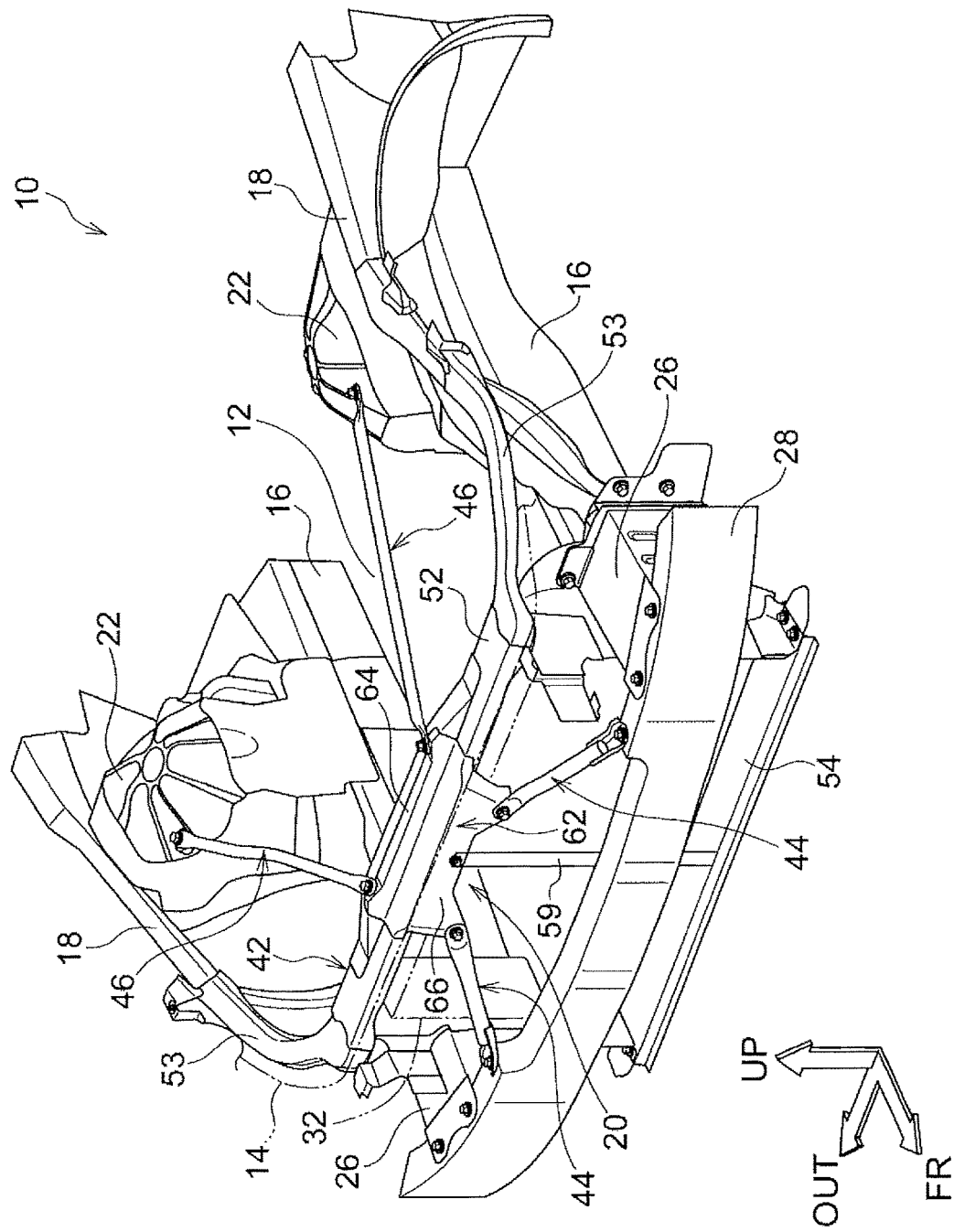
FIG. 1 is a perspective view of a vehicle front structure according to a first embodiment.

As shown in FIG. 1, the vehicle 10 includes the vehicle front structure 20 according to the first embodiment. The vehicle 10 has an engine compartment 12 at its front. The engine compartment 12 accommodates an engine (not shown). The upper end opening of the engine compartment 12 is opened or closed by an engine hood 14. The engine hood 14 serves as an example of a hood. A pair of right and left front side members 16, a pair of right and left apron upper members 18 and a pair of right and left suspension towers 22 are provided in the engine compartment 12 such that each of the pairs is spaced apart from each other in the vehicle width direction.

The front side members 16 extend in the vehicle longitudinal direction. Each front side member 16 is joined by fastening to a bumper reinforcement 28 via a crash box 26. The long side of the bumper reinforcement 28 is oriented in the vehicle width direction. That is, the bumper reinforcement 28 spans between the front ends of the right and left crash boxes 26.

The apron upper members 18 are, for example, formed by press-molding a steel sheet. The apron upper members 18 extend in the vehicle longitudinal direction at both right and left sides of the engine compartment 12. Each apron upper member 18 is arranged above a corresponding one of the front side members 16 on the outer side of the corresponding front side member 16 in the vehicle width direction. The front end of each apron upper member 18 is joined with the rear end of a corresponding one of the crash boxes 26.

Each suspension tower 22 is an example of a vehicle component, and is made of an aluminum casting. The suspension towers 22 are provided on the inner side of the right and left apron upper members 18 in the vehicle width direction, and extend in the vehicle vertical direction. Each suspension tower 22 is configured to retain the upper end of a suspension. The suspension supports a front wheel accommodated inside a wheel house (not shown).

A radiator support 42 is provided between the front portions of the right and left front side members 16. The radiator support 42 supports a radiator 32 for cooling an engine (not shown). The details of the radiator support 42 will be described later.

<Schematic Configuration>

The vehicle front structure 20 includes a radiator support upper 52, two first braces 44 and two second braces 46. The radiator support upper 52 constitutes part of the radiator support 42. Each first brace 44 serves as an example of a first connection member. Each second brace 46 serves as an example of a second connection member.

Figure 2:
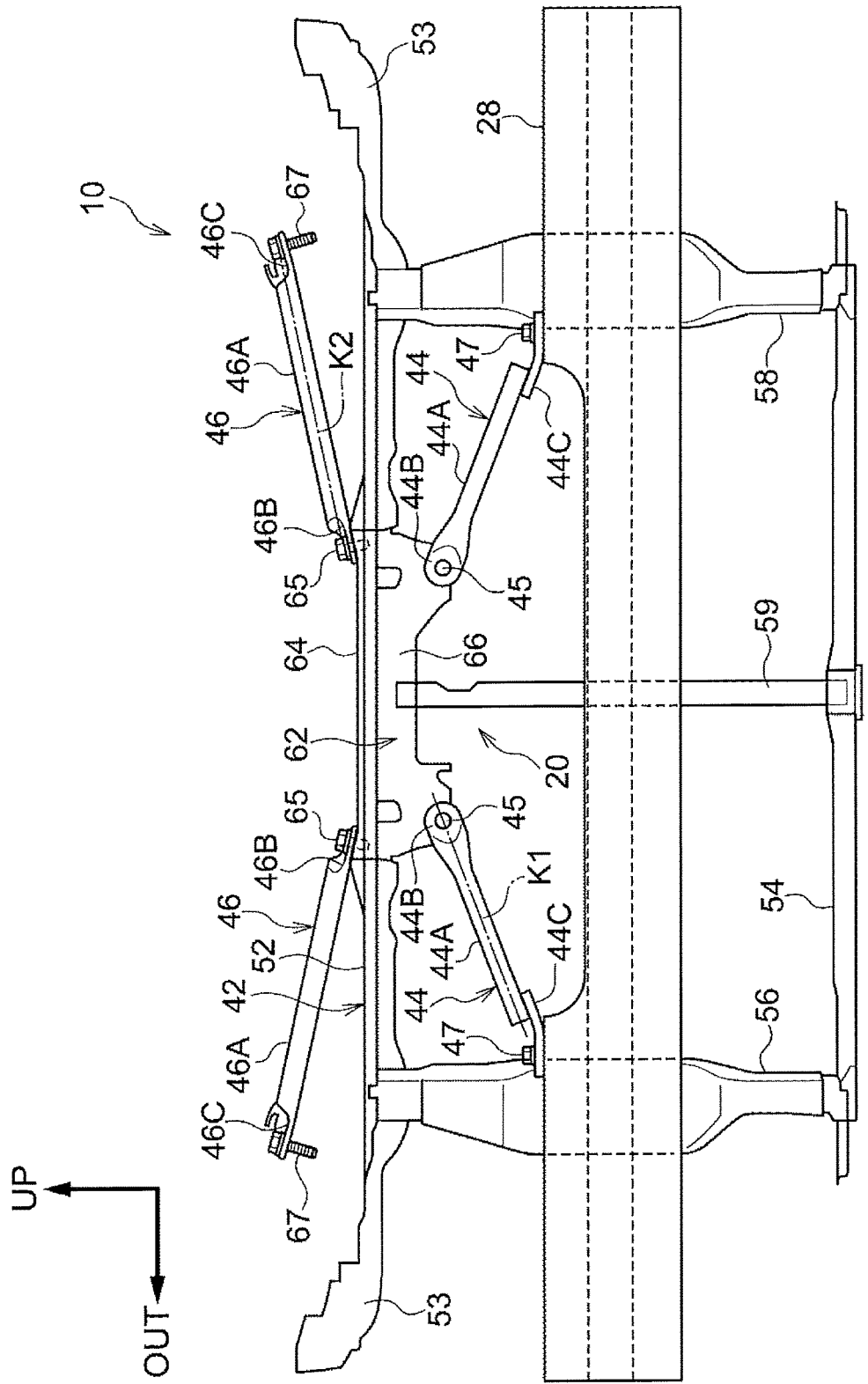
FIG. 2 is a front view of the vehicle front structure according to the first embodiment.

As shown in FIG. 2, the radiator support 42 includes the radiator support upper 52, a radiator support lower 54, radiator support sides 56, 58 and a center brace 59. The radiator support upper 52 and the radiator support lower 54 are opposed to each other in the vehicle vertical direction. The radiator support sides 56, 58 are opposed to each other in the vehicle width direction. That is, the radiator support 42 is formed in a rectangular frame shape when viewed in the vehicle longitudinal direction (in vehicle front view).

The radiator support lower 54 is arranged below the bumper reinforcement 28 in vehicle front view, and extends in the vehicle width direction. The radiator support sides 56, 58 extend from both ends of the radiator support lower 54 in the vehicle width direction toward the vehicle upper side beyond the bumper reinforcement 28. Part of each of the radiator support sides 56, 58 is secured to the inner face of a corresponding one of the crash box 26 (see FIG. 1) in the vehicle width direction via a plate (not shown). The center brace 59 connects, in the vehicle vertical direction, the middle portion of the radiator support upper 52 in the vehicle width direction with the middle portion of the radiator support lower 54 in the vehicle width direction.

<Radiator Support Upper>

The radiator support upper 52 is arranged between the upper ends (vehicle upper-side ends) of the radiator support sides 56, 58, and extends in the vehicle width direction. The cross-sectional shape of the radiator support upper 52 is, for example, a substantially L shape when viewed in the vehicle width direction. A center bracket 62 is provided on the inner side of both ends (at the center) of the radiator support upper 52 in the vehicle width direction. The first braces 44 and the second braces 46 (described later) are connected to the center bracket 62. The center bracket 62 serves as an example of a connected portion.

The center bracket 62 has a horizontal wall 64 and a vertical wall 66. The horizontal wall 64 extends in the vehicle longitudinal direction. The horizontal wall 64 serves as an example of a lock portion. The vertical wall 66 extends from the vehicle front end of the horizontal wall 64 toward the vehicle lower side. The horizontal wall 64 is put on the radiator support upper 52 from the upper side in the vehicle vertical direction, and is joined with the radiator support upper 52. The horizontal wall 64 has fastening holes (not shown) at both ends in the vehicle width direction. The second braces 46 (described later) are respectively fastened to the fastening holes by bolts 65. The fastening holes are, for example, through-holes that extend through the horizontal wall 64 along substantially the vehicle vertical direction.

The vertical wall 66 is provided integrally with the radiator support upper 52. The vertical wall 66 projects from the center brace 59 toward the right and left sides (toward both sides) with respect to the center brace 59. That is, the vertical wall 66 extends in the vehicle width direction and in the vehicle vertical direction. The vertical wall 66 has fastening holes (not shown) at both ends in the vehicle width direction at the lower end in the vehicle vertical direction. The first braces 44 (described later) are respectively fastened to the fastening holes by bolts 45. The fastening holes are, for example, through-holes that extend through the vertical wall 66 along substantially the vehicle longitudinal direction.

The vertical wall 66 is provided with a lock mechanism (not shown) at the center in the vehicle width direction. The lock mechanism is used to lock the engine hood 14 (see FIG. 1) to the radiator support upper 52. The vertical wall 66 is arranged on a central axis K1 (described later) of each first brace 44, and is configured to lock the engine hood 14 of the vehicle 10.

The radiator support upper 52 is provided with radiator support upper sides 53 at both ends in the vehicle width direction. The radiator support upper sides 53 extend obliquely from both ends of the radiator support upper 52 in the vehicle width direction toward the vehicle rear side and the vehicle upper side, and are respectively coupled to the front ends of the apron upper members 18 (see FIG. 1).

<First Brace>

Each first brace 44 is, for example, formed of a substantially cylindrical body portion 44A, a first mounting portion 44B and a second mounting portion 44C. The first mounting portion 44B is formed in a flat plate shape on one end of the body portion 44A in the axial direction. The second mounting portion 44C is joined with the other end of the body portion 44A in the axial direction. The first mounting portion 44B is arranged along the vehicle width direction and the vehicle vertical direction. The first mounting portion 44B has a fastening hole (not shown) that extends through in the vehicle longitudinal direction.

The second mounting portion 44C is formed in a substantially U shape (trough shape) when viewed in the axial direction of the body portion 44A. The second mounting portion 44C is put on the other side of the body portion 44A from the lower side in the vehicle vertical direction. The second mounting portion 44C has a fastening hole (not shown) that extends through in the vehicle vertical direction.

The first mounting portion 44B is fastened to the fastening hole of the vertical wall 66 by the bolt 45. The second mounting portion 44C is fastened to a fastening hole (not shown) by a bolt 47. The fastening hole is provided at the upper portion of the bumper reinforcement 28. In other words, the first braces 44 connect the vertical wall 66 of the center bracket 62 with the bumper reinforcement 28.

When viewed in the vehicle longitudinal direction (in vehicle front view), the first brace 44 on the left side with respect to the center brace 59 extends from the portion fastened to the vertical wall 66 toward the left end side in the vehicle width direction and the vehicle lower side. That is, the left-side first brace 44 is arranged with the axial direction set to an oblique direction in which the outer-side end in the vehicle width direction is located on the vehicle lower side with respect to the inner-side end. In vehicle front view, the first brace 44 on the right side with respect to the center brace 59 extends from the portion fastened to the vertical wall 66 toward the right end side in the vehicle width direction and the vehicle lower side. That is, the right-side first brace 44 is arranged with the axial direction set to an oblique direction in which the outer-side end in the vehicle width direction is located on the vehicle lower side with respect to the inner-side end.

In other words, each first brace 44 is arranged such that the portion of the first brace 44, connected to the center bracket 62, is located on the inner side in the vehicle width direction with respect to the portion of the first brace 44, connected to the bumper reinforcement 28. Each first brace 44 connects the center bracket 62 with the bumper reinforcement 28 in the oblique direction that intersects with the vehicle width direction. The right-side and left-side first braces 44 are arranged symmetrically with respect to the center brace 59 when viewed in the vehicle longitudinal direction.

Figure 3:
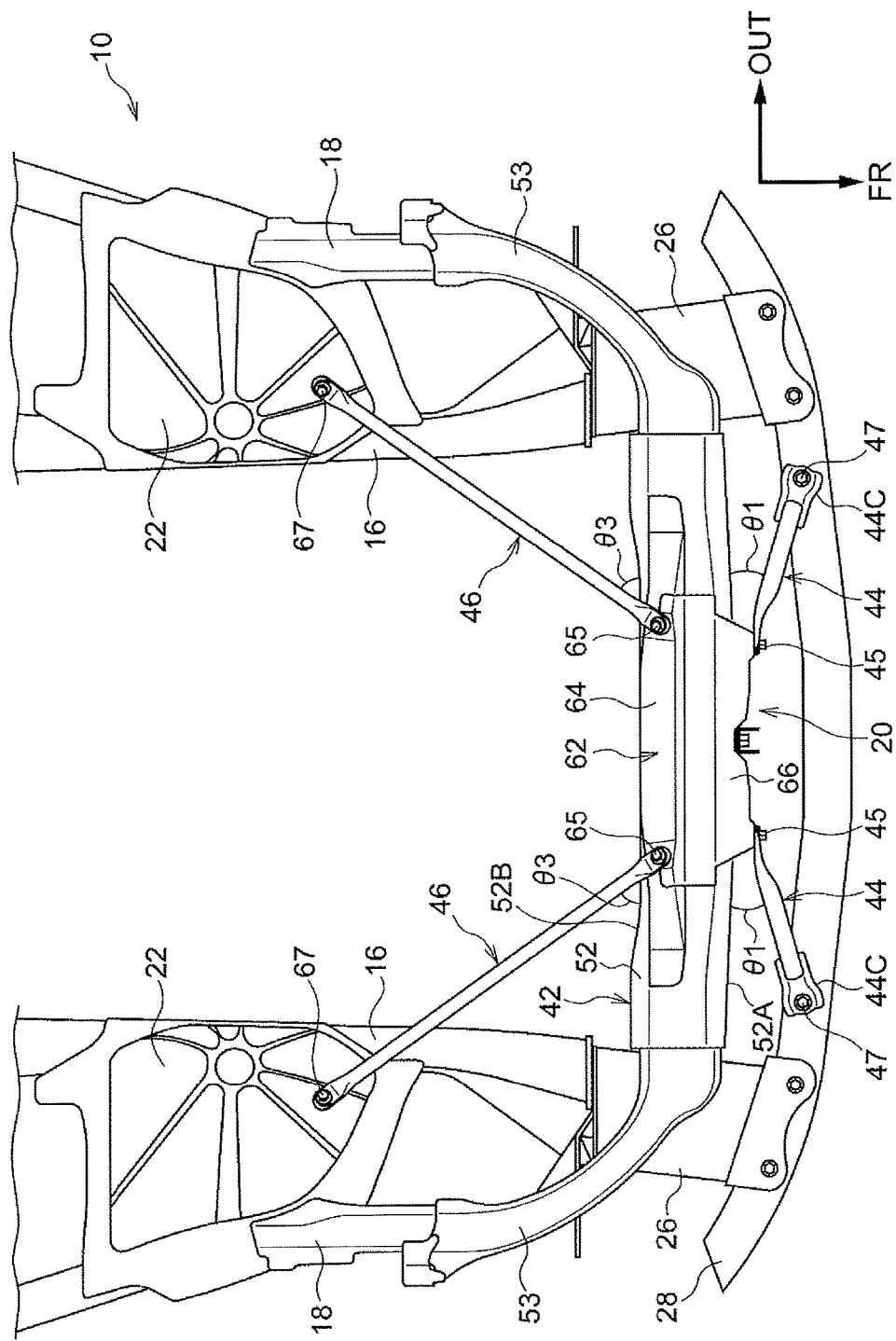
FIG. 3 is a plan view of the vehicle front structure according to the first embodiment.
Figure 4:
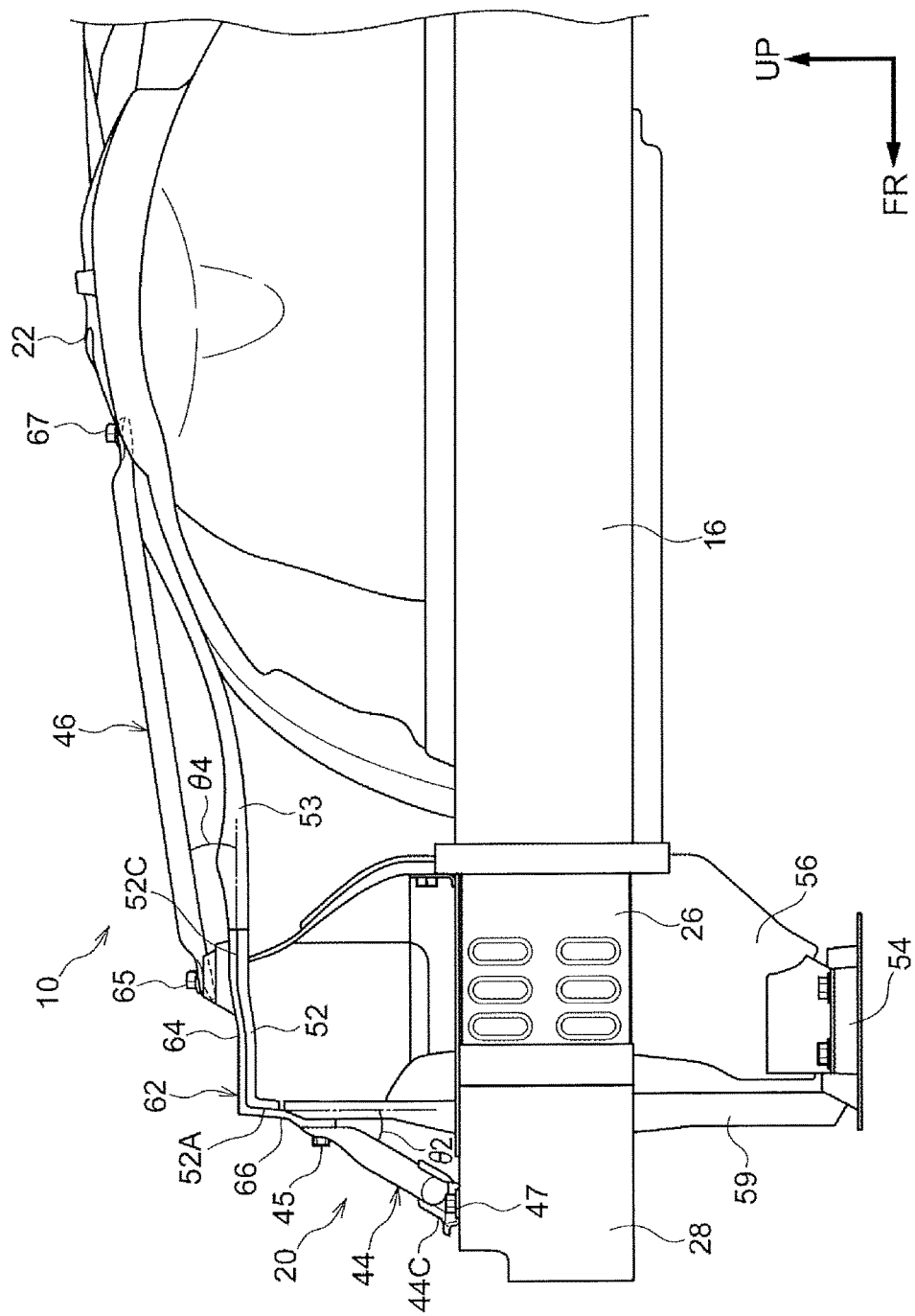
FIG. 4 is a side view of the vehicle front structure according to the first embodiment.

As shown in FIG. 3, in vehicle plan view (when viewed from the upper side in the vehicle vertical direction), the right and left first braces 44 each are arranged in an oblique direction at an angle of θ1 with respect to the front face 52A of the radiator support upper 52. As shown in FIG. 4, in vehicle side view (when viewed in the vehicle width direction), the right and left first braces 44 each are arranged in an oblique direction at an angle of θ2 with respect to the front face 52A of the radiator support upper 52. FIG. 4 shows the radiator support upper 52 and the center bracket 62 in longitudinal section.

<Second Brace>

As shown in FIG. 2, each second brace 46 is, for example, formed of a substantially cylindrical body portion 46A, a third mounting portion 46B and a fourth mounting portion 46C. The third mounting portion 46B is formed in a flat plate shape on one end of the body portion 46A in the axial direction. The fourth mounting portion 46C is formed in a flat plate shape on the other end of the body portion 44A in the axial direction. The length of the body portion 46A in the axial direction is longer than the length of the first brace 44 in the axial direction. The third mounting portion 46B and the fourth mounting portion 46C are arranged along an oblique direction in which the outer side in the vehicle width direction is located on the vehicle upper side with respect to the inner side. Each of the third mounting portion 46B and the fourth mounting portion 46C has a fastening hole (not shown) that extends through in the thickness direction.

The third mounting portion 46B is fastened to the fastening hole of the radiator support upper 52 and the fastening hole of the horizontal wall 64 by a bolt 65. The fourth mounting portion 46C is fastened to a fastening hole (not shown) by a bolt 67. The fastening hole is provided at the upper portion of the suspension tower 22 (see FIG. 1). In other words, each second brace 46 connects the radiator support upper 52 and the horizontal wall 64 of the center bracket 62 with a corresponding one of the suspension towers 22.

In vehicle front view, the second brace 46 on the left side with respect to the center brace 59 extends from the portion fastened to the horizontal wall 64 toward the left end side in the vehicle width direction and the vehicle upper side. That is, the left-side second brace 46 is arranged with the axial direction set to an oblique direction in which the outer-side end in the vehicle width direction is located on the vehicle upper side with respect to the inner-side end. In vehicle front view, the second brace 46 on the right side with respect to the center brace 59 extends from the portion fastened to the horizontal wall 64 toward the right end side in the vehicle width direction and the vehicle upper side. That is, the right-side second brace 46 is arranged with the axial direction set to an oblique direction in which the outer-side end in the vehicle width direction is located on the vehicle upper side with respect to the inner-side end. The right-side and left-side second braces 46 are arranged symmetrically with respect to the center brace 59 in vehicle front view.

The position at which each second brace 46 is fastened to the center bracket 62 (the position of the central axis of the bolt 65) is, for example, located on the outer side in the vehicle width direction with respect to the position at which the same-side first brace 44 is fastened to the center bracket 62 (the position of the central axis of the bolt 45).

As shown in FIG. 3, in vehicle plan view, each second brace 46 is arranged in an oblique direction at an angle of θ3 (>θ1) with respect to the rear face 52B of the radiator support upper 52. As shown in FIG. 4, in vehicle side view, each second brace 46 is arranged in an oblique direction at an angle of θ4 (>θ2) with respect to the upper face 52C of the radiator support upper 52.

The actual first braces 44 and the actual second braces 46 are partially slightly curved; however, the following description will be made on the assumption that the first braces 44 and the second braces 46 each have a cylindrical shape. In the following description, arrangement of the left-side first brace 44 and the right-side second brace 46 in vehicle front view will be described, and the description of arrangement of the right-side first brace 44 and the left-side second brace 46 is omitted.

As shown in FIG. 2, the central axis of the left-side first brace 44 in vehicle front view is referred to as straight line K1, and is indicated by the alternate long and short dashes line. The central axis of the right-side second brace 46 in vehicle front view is referred to as straight line K2, and is indicated by the alternate long and short dashes line. The central axis K1 and the central axis K2 are arranged so as to intersect with each other in vehicle front view. Specifically, the portion at which the second brace 46 is fastened to the radiator support upper 52 and the center bracket 62 is located on the central axis K1. That is, in the vehicle front structure 20 according to the first embodiment, the third mounting portion 46B is located on the central axis K1 of the first brace 44 along the oblique direction. In the vehicle front structure 20, in vehicle front view, the central axis K1 of the first brace 44 and the central axis K2 of the second brace 46 at least partially overlap each other (overlap in a range wider than a point).

Comparative Embodiment

Figure 5A:
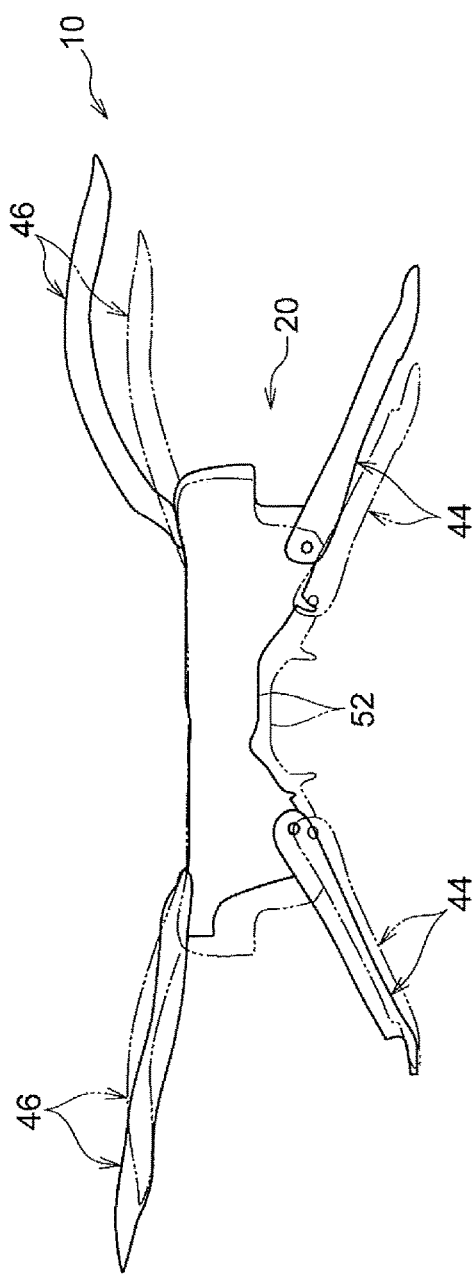
FIG. 5A is a view that illustrates a deformed state of the vehicle front structure according to the first embodiment in the event of a collision.
Figure 5B:
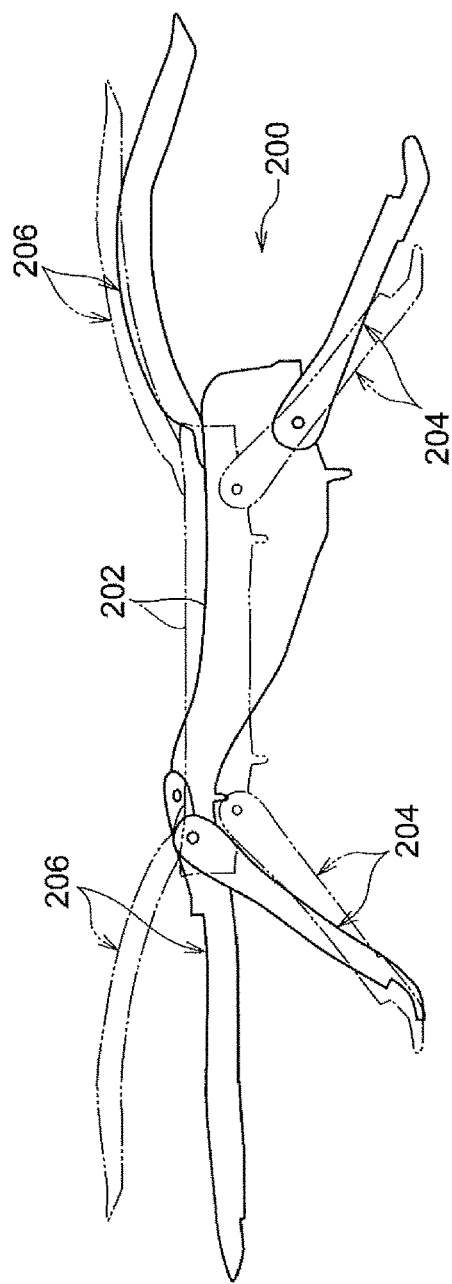
FIG. 5B is a view that illustrates a deformed state of a vehicle front structure according to a comparative embodiment in the event of a collision.

FIG. 5B schematically shows a vehicle front structure 200 according to a comparative embodiment. The alternate long and two-short dashes line in FIG. 5B indicates the outline of the vehicle front structure 200 before a frontal collision, and the continuous line indicates the outline of the vehicle front structure 200 in the event of a frontal collision.

The vehicle front structure 200 according to the comparative embodiment has such a configuration that the ends of two front braces 204 and the ends of two rear braces 206 are fastened to a radiator support upper 202 that extends in the vehicle width direction. The two front braces 204 are arranged on the vehicle front side with respect to the two rear braces 206 in vehicle plan view. In vehicle front view, the two front braces 204 and the two rear braces 206 are arranged in oblique directions symmetrically with respect to the center of the radiator support upper 202 in the vehicle width direction. In vehicle front view, the fastened portion of the left-side rear brace 206 is not located on the central axis of the right-side front brace 204. In vehicle front view, the fastened portion of the right-side rear brace 206 is not located on the central axis of the left-side front brace 204.

In the vehicle front structure 200 according to the comparative embodiment, for example, it is assumed that, in the event of a frontal collision (offset collision) of the vehicle, a collision load has been input to the left-side front brace 204 in vehicle front view. At this time, since the rear brace 206 is not located on the central axis of the front brace 204, the collision load input from the front brace 204 to the radiator support upper 202 is difficult to be transferred to the rear brace 206. In other words, in the vehicle front structure 200 according to the comparative embodiment, a collision load may not be efficiently transferred (distributed) from the front brace 204 to the rear brace 206 and stress may concentrate on the front brace 204 and the fastened portion of the front brace 204. The amount of deformation of the front (the radiator support upper 202 and the front brace 204) of the vehicle may be larger in the vehicle front structure 200 according to the comparative embodiment than in the configuration in which the rear brace 206 is located on the central axis of the front brace 204.

Operation

Next, the operation and advantageous effects of the vehicle front structure 20 according to the first embodiment will be described.

FIG. 5A schematically shows the vehicle front structure 20 according to the first embodiment. The alternate long and two-short dashes line in FIG. 5A indicates the outline of the vehicle front structure 20 before a frontal collision, and the continuous line indicates the outline of the vehicle front structure 20 in the event of a frontal collision.

In the event of a frontal collision (offset collision) of the vehicle 10, a collision load input from the bumper reinforcement 28 (see FIG. 1) is input to the radiator support upper 52 via the first brace 44. The collision load is transferred from the radiator support upper 52 via the second brace 46 to the suspension tower 22 (see FIG. 1) on the non-collision side.

In the vehicle front structure 20, the portion at which the second brace 46 is connected to the radiator support upper 52 is located on the central axis K1 (see FIG. 2) of the first brace 44. In other words, a load transfer path is further formed on an extended line of the central axis K1 of the first brace 44. For this reason, in comparison with the vehicle front structure 200 (see FIG. 5B) according to the comparative embodiment, a collision load input to the first brace 44 is easy to be input to the second brace 46 through the radiator support upper 52. Thus, it is possible to relieve stress concentration on the first brace 44 in the event of a collision. The vehicle front structure 20 is able to reduce a deformation of the first brace 44 and radiator support upper 52 as compared to the vehicle front structure 200 according to the comparative embodiment.

The case of a frontal collision of the vehicle 10 is described; however, with the vehicle front structure 20, it is possible to relieve stress concentration on the first brace 44 even when the vehicle 10 is traveling on a bad road having large irregularities. Thus, it is possible to suppress a decrease in the steering stability of the vehicle 10.

In the vehicle front structure 20, the first brace 44 and the second brace 46 are substantially arranged in a straight line. For this reason, a collision load input from the first brace 44 to the second brace 46 via the radiator support upper 52 is easy to be transferred to the non-collision side of the second brace 46 in the central axis direction. Thus, it is possible to further relieve stress concentration on the first brace 44 in the event of a frontal collision.

In addition, in the vehicle front structure 20 shown in FIG. 1, the horizontal wall 64 for locking the engine hood 14 is integrally provided with the radiator support upper 52. The second brace 46 is connected to the radiator support upper 52 via the horizontal wall 64. Thus, in comparison with the configuration in which the second brace 46 is connected to the radiator support upper 52 and the horizontal wall 64 is provided at a portion separated from the radiator support upper 52, space required to install the horizontal wall 64 is reduced. In other words, it is possible to ensure space for the horizontal wall 64 without increasing the size of the vehicle 10.

Second Embodiment

Next, a vehicle front structure 70 according to a second embodiment will be described.

Figure 6:
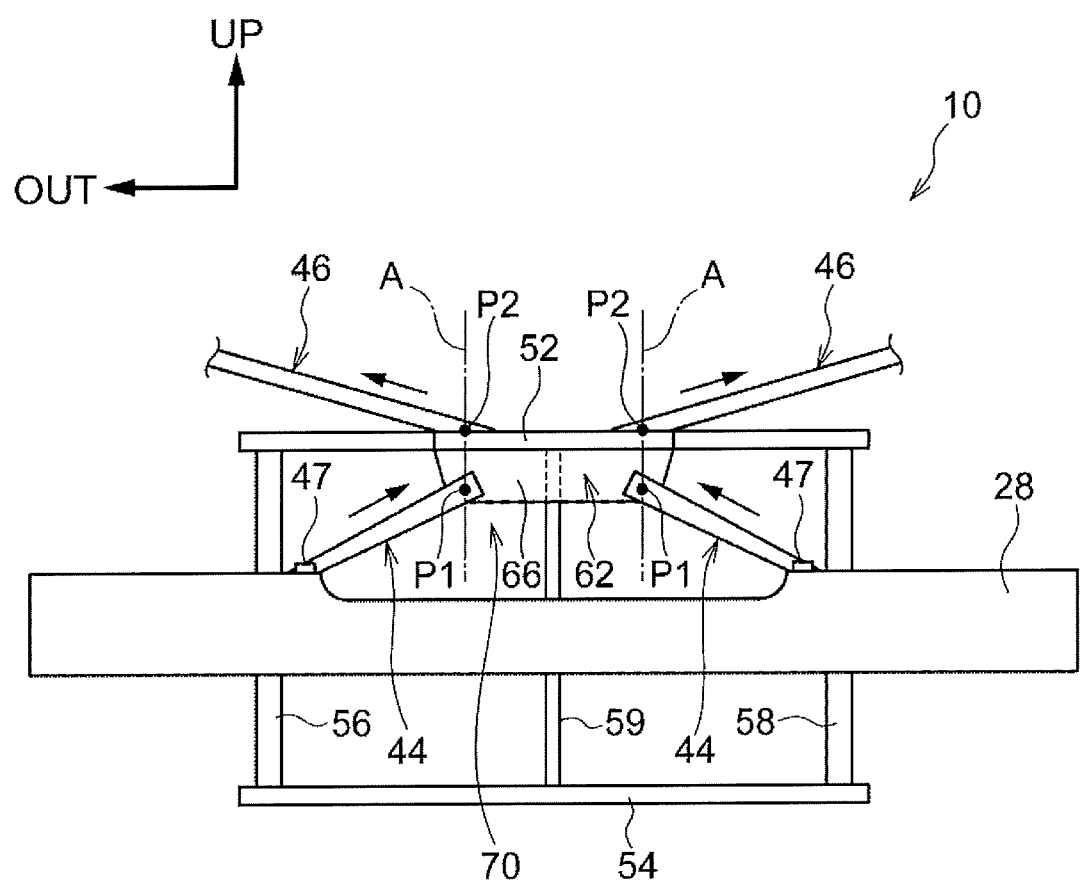
FIG. 6 is a front view of a vehicle front structure according to a second embodiment.

FIG. 6 schematically shows the vehicle front structure 70. The vehicle front structure 70 is provided in the vehicle 10 (see FIG. 1) according to the first embodiment instead of the vehicle front structure 20 (see FIG. 1). Like reference numerals denote members and portions in the vehicle front structure 70, basically the same as the members and portions of the above-described first embodiment, and the description thereof is omitted.

The vehicle front structure 70 includes the radiator support upper 52, the two first braces 44, the two second braces 46, the center brace 59 and the center bracket 62. The vehicle front structure 70 differs from the vehicle front structure 20 only in the radiator support upper 52-side connected position of each second brace 46. In the vehicle front structure 70, the first brace 44 are respectively provided on both sides in the vehicle width direction, the second braces 46 are respectively provided on both sides in the vehicle width direction, and these are symmetrical with respect to the center brace 59. For this reason, the left-side structure in vehicle front view will be described, and the description of the right-side structure is omitted.

The position at which the first brace 44 is connected to the center bracket 62 (vertical wall 66) is referred to as first connection position P1. The first connection position P1 is located on the inner side (center brace 59 side) in the vehicle width direction with respect to the portion at which the first brace 44 is connected to the bumper reinforcement 28 (the fastened portion of the bolt 47) in vehicle front view.

The position at which the second brace 46 is connected to the center bracket 62 (radiator support upper 52) is referred to as second connection position P2. The second connection position P2 is located on the inner side in the vehicle width direction (center brace 59 side) with respect to the portion at which the second brace 46 is connected to the suspension tower 22 (see FIG. 1) in vehicle front view. The left-side second connection position P2 in vehicle front view is aligned in the vehicle vertical direction with the left-side first connection position P1. In other words, the second connection position P2 in the vehicle width direction and the first connection position P1 in the vehicle width direction are substantially the same, and are arranged on the imaginary line A indicated by the alternate long and short dashes line along the vehicle vertical direction.

<Operation>

Next, the operation and advantageous effects of the vehicle front structure 70 according to the second embodiment will be described.

In the vehicle front structure 70, a collision load input from the bumper reinforcement 28 in the event of a frontal collision of the vehicle 10 is input to the center bracket 62 (radiator support upper 52) via the first brace 44. The collision load is transferred from the radiator support upper 52 via the second brace 46 to the suspension tower 22 (see FIG. 1) on non-collision side.

For example, in vehicle front view, the left-side first connection position P1 and the left-side second connection position P2 are aligned in the vehicle vertical direction. For this reason, a collision load input from the first brace 44 to the radiator support upper 52 at the left-side first connection position P1 is easy to be input from the radiator support upper 52 to the left-side second brace 46 at the left-side second connection position P2. That is, a collision load input from the left-side first brace 44 to the radiator support upper 52 is transferred to the left-side second brace 46. Thus, stress is difficult to concentrate on the first brace 44, so it is possible to relieve stress concentration on the first brace 44 in the event of a frontal collision. The right-side first brace 44 and the right-side second brace 46 in vehicle front view provide a similar operation to the left-side ones, so the description is omitted.

The case of a frontal collision of the vehicle 10 is described; however, with the vehicle front structure 70, it is possible to relieve stress concentration on the first brace 44 even when the vehicle 10 is traveling on a bad road having large irregularities. Thus, it is possible to suppress a decrease in the steering stability of the vehicle 10.

Third Embodiment

Next, a vehicle front structure 90 according to a third embodiment will be described.

Figure 7:
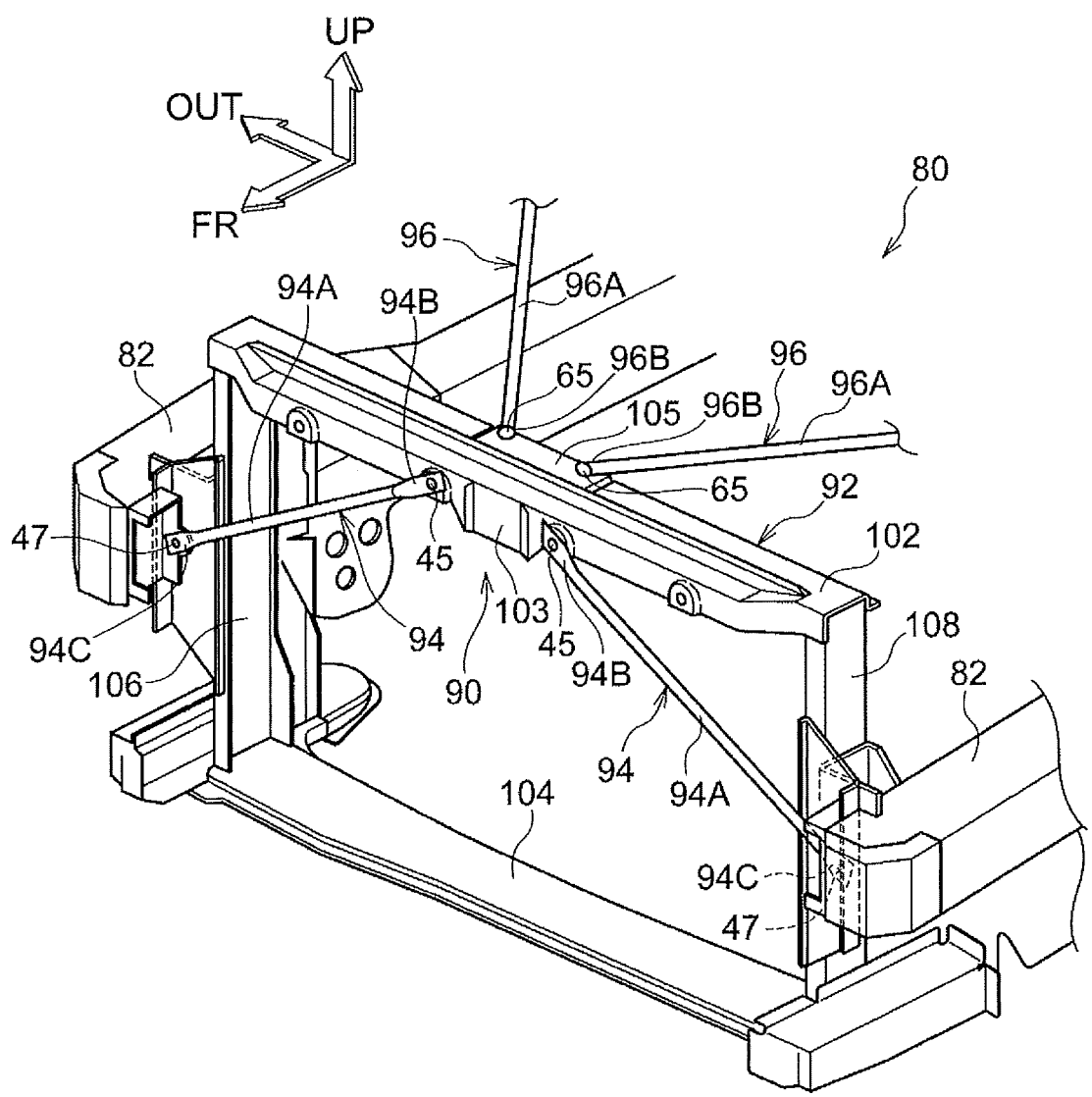
FIG. 7 is a perspective view of a vehicle front structure according to a third embodiment.

FIG. 7 shows the vehicle front structure 90 provided in a vehicle 80 according to the third embodiment. The vehicle 80 includes a pair of right and left front side members 82 as an example of side members. Each front side member 82 extends in the vehicle longitudinal direction, and is coupled to a bumper reinforcement (not shown). The side member in the present embodiment includes not only a side member alone but also a side member including a crash box. The vehicle front structure 90 includes a radiator support upper 102, two first braces 94 and two second braces 96. The radiator support upper 102 constitutes part of a radiator support 92. Each first brace 94 serves as an example of a first connection member. Each second brace 96 serves as an example of a second connection member.

The radiator support 92 includes the radiator support upper 102, a radiator support lower 104, and radiator support sides 106, 108. The radiator support upper 102 and the radiator support lower 104 extend in the vehicle width direction, and are opposed to each other in the vehicle vertical direction. The radiator support sides 106, 108 extend in the vehicle vertical direction, and are opposed to each other in the vehicle width direction. The radiator support 92 is formed in a rectangular frame shape when viewed in the vehicle longitudinal direction (in vehicle front view).

<Radiator Support Upper>

The cross section of the radiator support upper 102 when viewed in the vehicle width direction is, for example, formed in a substantially U shape that opens toward the lower side in the vehicle vertical direction. A vertical wall 103 is provided at a portion (center) on the inner side with respect to both ends of the radiator support upper 102 in the vehicle width direction. The vertical wall 103 serves as an example of a connected portion.

The vertical wall 103 is arranged along the vehicle vertical direction and the vehicle width direction. The vertical wall 103 has two fastening holes (not shown). One end of each first brace 94 (described later) is fastened to a corresponding one of the fastening holes of the vertical wall 103 by the bolt 45. The horizontal wall 105 at the center of the radiator support upper 102 in the vehicle width direction on the vehicle upper side has two fastening holes (not shown). One end of each second brace 96 (described later) is fastened to a corresponding one of the fastening holes of the horizontal wall 105 by the bolt 65.

<First Brace>

Each first brace 94 is, for example, formed of a substantially cylindrical body portion 94A, a first mounting portion 94B and a second mounting portion 94C. The first mounting portion 94B is formed in a flat plate shape on one end of the body portion 94A in the axial direction. The second mounting portion 94C is formed in a flat plate shape on the other end of the body portion 94A in the axial direction. Each of the first mounting portion 94B and the second mounting portion 94C has a fastening hole (not shown) that extends through in the vehicle longitudinal direction.

The first mounting portion 94B is fastened to the fastening hole of the vertical wall 103 by the bolt 45. The second mounting portion 94C is fastened to a fastening hole (not shown) of the front side member 82 by the bolt 47. In other words, each first brace 94 connects the vertical wall 103 of the radiator support upper 102 with a corresponding one of the front side members 82. The right-side and left-side first braces 94 in vehicle front view are arranged with the axial direction set to an oblique direction in which the second mounting portion 94C is located on the vehicle lower side with respect to the first mounting portion 94B (a direction that intersects with the vehicle width direction). In other words, each first brace 94 is arranged such that the first mounting portion 94B is located on the inner side in the vehicle width direction with respect to the second mounting portion 94C.

<Second Brace>

Each second brace 96 is, for example, formed of a substantially cylindrical body portion 96A, a third mounting portion 96B and a fourth mounting portion (not shown). The third mounting portion 96B is formed in a flat plate shape on one end of the body portion 96A in the axial direction. The fourth mounting portion (not shown) is formed in a flat plate shape on the other end of the body portion 96A in the axial direction. Each of the third mounting portion 96B and the fourth mounting portion has a fastening hole (not shown) that extends through in the vehicle vertical direction.

The third mounting portion 96B is fastened to the fastening hole by the bolt 65. The fastening hole is provided in the radiator support upper 102. The fourth mounting portion (not shown) is fastened to a fastening hole of the suspension tower 22 (see FIG. 1) by a bolt. In other words, each second brace 96 connects the radiator support upper 102 with a corresponding one of the suspension towers 22. The right-side and left-side second braces 96 in vehicle front view are arranged with the axial direction set to an oblique direction in which the fourth mounting portion (not shown) is located on the vehicle upper side with respect to the third mounting portion 96B (a direction that intersects with the vehicle width direction). In other words, each second brace 96 is arranged such that the third mounting portion 96B is located on the inner side in the vehicle width direction with respect to the fourth mounting portion. In vehicle front view, the third mounting portion 96B is located on the central axis of the first brace 94.

<Operation>

Next, the operation and advantageous effects of the vehicle front structure 90 according to the third embodiment will be described.

In the vehicle front structure 90, in the event of a frontal collision of the vehicle 80, a collision load input from a bumper reinforcement (not shown) to the front side member 82 is input from the front side member 82 to the radiator support upper 102 via the first brace 94. The collision load is transferred from the radiator support upper 102 via the second brace 96 to the suspension tower 22 (see FIG. 1) on the non-collision side.

The third mounting portion 96B is located on the central axis of the first brace 94. In other words, in the vehicle front structure 90, a load transfer path is further formed on an extended line of the central axis of the first brace 94. For this reason, in comparison with the configuration in which the third mounting portion 96B is located off from the central axis of the first brace 94, a collision load input to the first brace 94 is easy to be input to the second brace 96 via the radiator support upper 102. Thus, stress is difficult to concentrate on the first brace 94, so it is possible to relieve stress concentration on the first brace 94 in the event of a frontal collision.

The case of a frontal collision of the vehicle 80 is described; however, with the vehicle front structure 90, it is possible to relieve stress concentration on the first brace 94 even when the vehicle 80 is traveling on a bad road having large irregularities. Thus, it is possible to suppress a decrease in the steering stability of the vehicle 80.

ALTERNATIVE EMBODIMENTS

The disclosure is not limited to the above-described embodiments.

First Alternative Embodiment

Figure 8A:
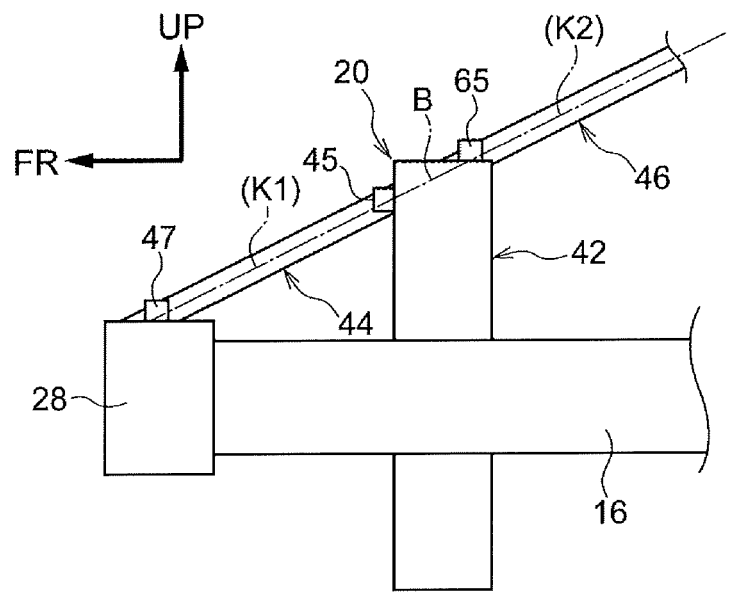
FIG. 8A is a side view of a vehicle front structure according to a first alternative embodiment.

As schematically shown in FIG. 8A, in the vehicle front structure 20, the first braces 44 and the second braces 46 may be arranged such that the central axis K1 of each first brace 44 and the central axis K2 of each second brace 46 are arranged on the same straight line B in vehicle side view.

Second Alternative Embodiment

Figure 8B:
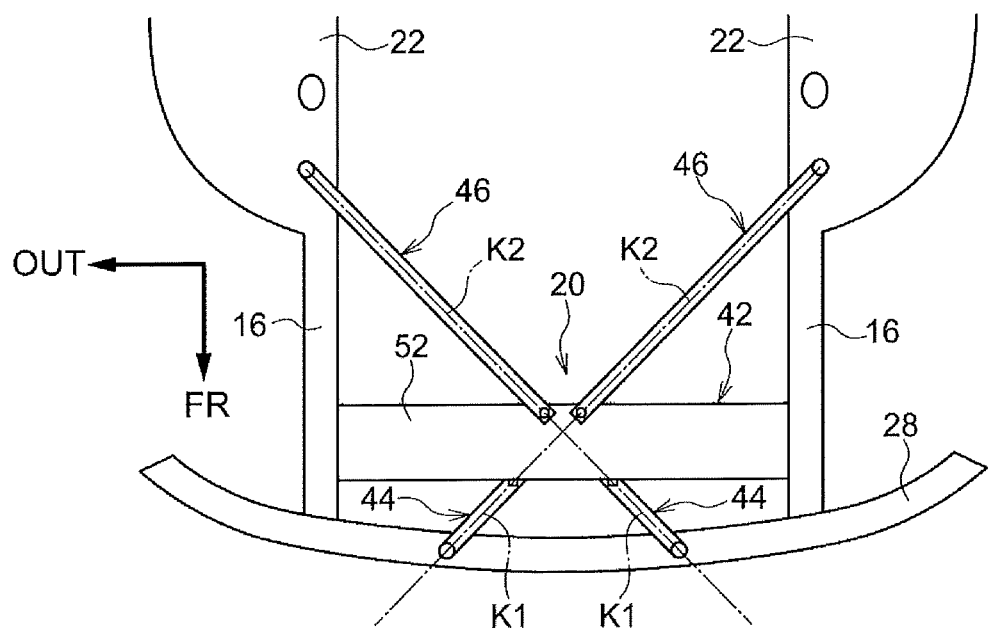
FIG. 8B is a plan view of a vehicle front structure according to a second alternative embodiment.

As schematically shown in FIG. 8B, in the vehicle front structure 20, the first braces 44 and the second braces 46 may be arranged such that the central axis K1 of each first brace 44 and the central axis K2 of the second brace 46 on the other side are arranged on the same straight line in vehicle plan view.

Other Alternative Embodiments

In the vehicle front structure 20, the central axis K1 and the central axis K2 may be arranged on the same straight line in vehicle front view. That is, the central axis K1 and the central axis K2 just need to be arranged so as to at least partially (including a point) overlap each other. The central axes K1, K2 are not limited to a linear shape, and may be partially or entirely formed in a curved shape.

In the vehicle front structure 20, each second brace 46 may be directly connected to the radiator support upper 52, and the center bracket 62 may be provided at a location separated from the radiator support upper 52.

The radiator support upper 52 and the center bracket 62 are not limited to the ones integrated by joining separate elements with each other. The radiator support upper 52 and the center bracket 62 may be integrated by molding. That is, the connected portion is not limited to the one provided on the radiator support upper 52, and may be formed in the radiator support upper 52.

In the vehicle front structure 70, the configuration in which the first connection position P1 and the second connection position P2 are aligned in the vehicle vertical direction in vehicle front view is not limited to the configuration in which such alignment is provided on both sides in the vehicle width direction. The configuration in which such alignment is provided on only the right side or only the left side in the vehicle width direction is also applicable.

Each of the first connection member and the second connection member is not limited to the one that directly connects the radiator support upper with the bumper reinforcement or the side member. Each of the first connection member and the second connection member may be the one that indirectly connects the radiator support upper with the bumper reinforcement or the side member via another member, such as a bracket. The vehicle front structure is not limited to the configuration in which the length of the second connection member in the axial direction is longer than the length of the first connection member in the axial direction. The vehicle front structure may have such a configuration that the length of the first connection member in the axial direction is longer than the length of the second connection member in the axial direction or such a configuration that the length of the first connection member and the length of the second connection member are equal to each other.

The first connection members and the second connection members are not limited to the configuration in which the first connection members are provided one by one on the right side and the left side and the second connection members are provided one by one on the right side and the left side in vehicle front view. The first connection members and the second connection members may have such a configuration that a plurality of the first connection members are provided on each of the right side and the left side or a plurality of the second connection members are provided on each of the right side and the left side. In addition, a collision load may be further easy to be transferred from the first connection member to the second connection member by increasing the width of the radiator support upper side (collision load input side) of the second connection member with respect to the width of the radiator support upper side (collision load output side) of the first connection member.

The vehicle component is not limited to the suspension tower 22. The vehicle component may be, for example, another vehicle component, such as the apron upper member 18.

The vehicle front structures according to the embodiments and alternative embodiments of the disclosure are described. These embodiments and alternative embodiments may be combined as needed. Of course, the disclosure may be implemented in various forms without departing from the scope of the disclosure.

What is claimed is:

1. A vehicle front structure comprising:
   a radiator support upper provided with a bracket on an inner side with respect to both ends of the radiator support upper in a vehicle width direction, the bracket including a first wall portion and a second wall portion, the first wall portion extending in a vehicle longitudinal direction, and the second wall portion extending from a front end of the first wall portion toward a vehicle lower side;
   a first connection member, when viewed in the vehicle longitudinal direction, connecting the second wall portion with a bumper reinforcement in an oblique direction such that a portion of the first connection member at which the first connection member is connected to the second wall portion, is located on an inner side in the vehicle width direction with respect to a portion of the first connection member at which the first connection member is connected to the bumper reinforcement, the oblique direction intersecting with the vehicle width direction; and
   a second connection member connecting the first wall portion with a vehicle component, a portion of the second connection member at which the second connection member is connected to the first wall portion being located on a central axis of the first connection member along the oblique direction.

2. The vehicle front structure according to claim 1, wherein
   when viewed in the vehicle longitudinal direction, the central axis of the first connection member and a central axis of the second connection member at least partially overlap each other.

3. The vehicle front structure according to claim 1, wherein
   when viewed in the vehicle width direction, the central axis of the first connection member and a central axis of the second connection member are arranged on a straight line.

4. The vehicle front structure according to claim 1, wherein
   in vehicle plan view, the central axis of the first connection member and a central axis of the second connection member are arranged on a straight line.

5. The vehicle front structure according to claim 1, wherein
   the radiator support upper includes a lock portion for locking a hood of a vehicle, the lock portion is integrally provided with the radiator support upper, the lock portion is arranged on the central axis of the first connection member, and
   the second connection member is coupled to the radiator support upper via the lock portion.

6. A vehicle front structure comprising:
   a radiator support upper provided with a connected portion on an inner side with respect to both ends of the radiator support upper in a vehicle width direction;
   a plurality of first connection members, when viewed in a vehicle longitudinal direction, respectively arranged on both sides of the connected portion in the vehicle width direction, the plurality of first connection members connecting the connected portion with a bumper reinforcement in an oblique direction such that a first connection position is located on an inner side in the vehicle width direction with respect to a portion of each first connection member, connected to the bumper reinforcement, the oblique direction intersecting with the vehicle width direction, the first connection position being a position at which each first connection member is connected to the connected portion; and
   second connection members respectively arranged on both sides of the connected portion in the vehicle width direction, each second connection member connecting the radiator support upper with a vehicle component, a second connection position of one of the second connection members being aligned in a vehicle vertical direction with the first connection position, each second connection member being connected with the radiator support upper at the second connection position.

7. A vehicle front structure comprising:
   a radiator support upper provided with a connected portion on an inner side with respect to both ends of the radiator support upper in a vehicle width direction;
   a first connection member, when viewed in a vehicle longitudinal direction, connecting the connected portion with a side member in an oblique direction such that a portion of the first connection member at which the first connection member is connected to the connected portion, is located on an inner side in the vehicle width direction with respect to a portion of the first connection member at which the first connection member is connected to the side member, the oblique direction intersecting with the vehicle width direction; and
   a second connection member connecting the radiator support upper with a vehicle component, a portion of the second connection member at which the second connection member is connected to the radiator support upper, being located on a central axis of the first connection member along the oblique direction.

8. A vehicle front structure comprising:
   a radiator support upper provided with a connected portion on an inner side with respect to both ends of the radiator support upper in a vehicle width direction;
   a first connection member, when viewed in a vehicle longitudinal direction, connecting the connected portion with a bumper reinforcement in an oblique direction such that a portion of the first connection member at which the first connection member is connected to the connected portion, is located on an inner side in the vehicle width direction with respect to a portion of the first connection member at which the first connection member is connected to the bumper reinforcement, the oblique direction intersecting with the vehicle width direction; and
   a second connection member connecting the radiator support upper with a vehicle component, a portion of the second connection member at which the second connection member is connected to the radiator support upper being located on a central axis of the first connection member along the oblique direction,
   wherein the radiator support upper includes a lock portion for locking a hood of a vehicle, the lock portion is integrally provided with the radiator support upper, the lock portion is arranged on the central axis of the first connection member, and wherein the second connection member is coupled to the radiator support upper via the lock portion.

* * * * *